US00RE36898E

United States Patent [19]

Sawada et al.

[11] E Patent Number: Re. 36,898

[45] Reissued Date of Patent: Oct. 3, 2000

[54] COVER FOR A VEHICLE AIR BAG

[75] Inventors: Masami Sawada; Yuichi Nanbu, both of Shiga; Mitsuo Yoshiyasu, Chiba, all of Japan

[73] Assignee: Takata Corporation, Japan

[21] Appl. No.: 08/896,989

[22] Filed: Jul. 18, 1997

Related U.S. Patent Documents

Reissue of:

[64] Patent No.: 5,110,647
Issued: May 5, 1992
Appl. No.: 07/453,685
Filed: Dec. 20, 1989

[30] Foreign Application Priority Data

Dec. 26, 1988 [JP] Japan ..... 63-328323
Feb. 22, 1989 [JP] Japan ..... 1-42733

[51] Int. Cl.[7] ..... B60R 21/16

[52] U.S. Cl. ..... 428/43; 428/217; 280/728.1; 280/743.1

[58] Field of Search ..... 428/43, 217; 280/743.1, 280/731, 728.1

[56] References Cited

U.S. PATENT DOCUMENTS 3,819,205 6/1974 Dunford et al. ..... 280/150
4,120,516 10/1978 Takamatsu et al. ..... 280/728
4,148,503 4/1979 Shiratori et al. ..... 280/731
4,836,576 6/1989 Werner et al. ..... 280/731
4,895,389 1/1990 Pack, Jr. ..... 280/732
4,903,986 2/1990 Cok et al. ..... 280/743

FOREIGN PATENT DOCUMENTS 3545-028 7/1987 Germany .

OTHER PUBLICATIONS

Photographs H1–H8, GM Oldsmobile Airbag Cover, see applicant's cover letter for discussion of date Dec. 7, 1989.

*Primary Examiner*—Alexander Thomas
*Attorney, Agent, or Firm*—Rhodes & Mason, PLLC

[57] ABSTRACT

A cover for a vehicle air bag comprises an external surface layer injection-molded from a thermoplastic material having a JIS-A hardness of 20 to 90 and a core layer injection-molded from a thermoplastic material having a bending elastic modulus (JIS K 7203) of not less than about 1000 kg/cm$^2$ and a hardness greater than that of the surface layer. The core has weakened zones along which the cover breaks when the air bag is inflated.

16 Claims, 2 Drawing Sheets

COVER FOR A VEHICLE AIR BAG

Matter enclosed in heavy brackets [ ] appears in the original patent but forms no part of this reissue specification; matter printed in italics indicates the additions made by reissue.

FIELD OF THE INVENTION

The present invention relates to a cover for housing a folded vehicle safety air bag of the type that inflates virtually instantaneously upon the sensing of a rapid acceleration of the vehicle or some other event indicative of a collision of the vehicle and prevents the occupant from experiencing a secondary collision with parts of the vehicle, such as the steering wheel, dashboard or windshield, generally in front of him.

BACKGROUND OF THE INVENTION

Vehicle safety air bags are folded into a housing formed in part by a support that is attached to the vehicle, for example, the hub of the steering wheel, and to which the air bag is secured, and in part by a cover that is positioned generally between the folded air bag and the vehicle occupant. In a widely used type of air bag housing, the cover is made of a polymeric material and has weakened zones that enable it to break easily in a controlled manner when the air bag inflates, thereby enabling the air bag to emerge from the housing and fully inflate. With such a type of cover it is, of course, very important that pieces of the cover are not broken free and propelled toward the vehicle occupants, lest the occupants be injured by the flying pieces. A common way of ensuring that the cover is not broken into loose pieces is to provide reinforcing, commonly a net, to keep broken pieces of the cover from scattering. Examples of covers having reinforcing are disclosed in Japanese published patent applications Nos. 234764/1987 and 127336/1975 and Japanese published utility model applications Nos. 80928/1977, 43454/1975 and 25342/1976.

Covers with reinforcing nets are commonly made from a polymeric material with a relatively low strength, such as polyurethane foam. The net reinforcement is molded into the cover material and is interrupted to form zones of weakness so that the cover can be broken easily along those zones when the air bag inflates.

Japanese published utility model application No. 76042/1977 describes and shows an air bag cover having an external surface layer or skin of a hard polyurethane foam that provides a smooth external surface finish and a core of a low-density polyurethane foam that imparts softness (yieldability) to the cover as a whole. Zones of weakness in the form of slits or grooves are formed in the core to facilitate breaking of the cover.

The manufacture of air bags with reinforcing nets involves many steps, and it is difficult to make them with high accuracy, even when Reaction Injection Molding (RIM), is used, thus leading to a low yield rate and a high production cost.

The cover of Japanese Published Appln. No. 76042/1977 has a hard surface (Shore Hardness, 30 to 40, ASTM-2240) which is uncomfortable to the occupant if he contacts it. Also, the cover materials are of low strength, and because there is no reinforcing net, the cover is prone to being fragmented into pieces that are scattered when the air bag inflates.

SUMMARY OF THE INVENTION

An object of the present invention is to provide an air bag cover that has a surface that is soft and comfortable to the touch and in which a core under the surface layer holds its shape well under external loads for protection of the air bag. Another object is to provide a cover that is easily broken in a controlled manner when the bag inflates over a temperature range of from −40° C. to 80° C. When the cover breaks, no pieces are to be separated and scattered. Its appearance and performance are not to be significantly changed within the foregoing temperature range after exposing it to a temperature of 110° C. for 500 hours. Still another object is to provide an air bag cover that can be produced easily and economically with accuracy and with a minimum of rejects.

The foregoing and other objects of the invention are attained in accordance with the invention by an air bag cover that is characterized in that it has an external surface layer formed of a thermoplastic polymeric material having a Type A hardness of from about 20 to about 90 as determined by Japanese Industrial Standard K6301-1975 and a core layer formed of thermoplastic polymeric material and having a modulus of elasticity in flexure of not less than about 1000 $kg/cm^2$ as determined in accordance with Japanese Industrial Standard K7203-1982 and a hardness greater than that of the surface layer and in that the weakened zones are formed in the core layer.

For a better understanding of the invention reference may be made to the following description of preferred embodiments and examples.

DESCRIPTION OF EMBODIMENTS

Figure 1:
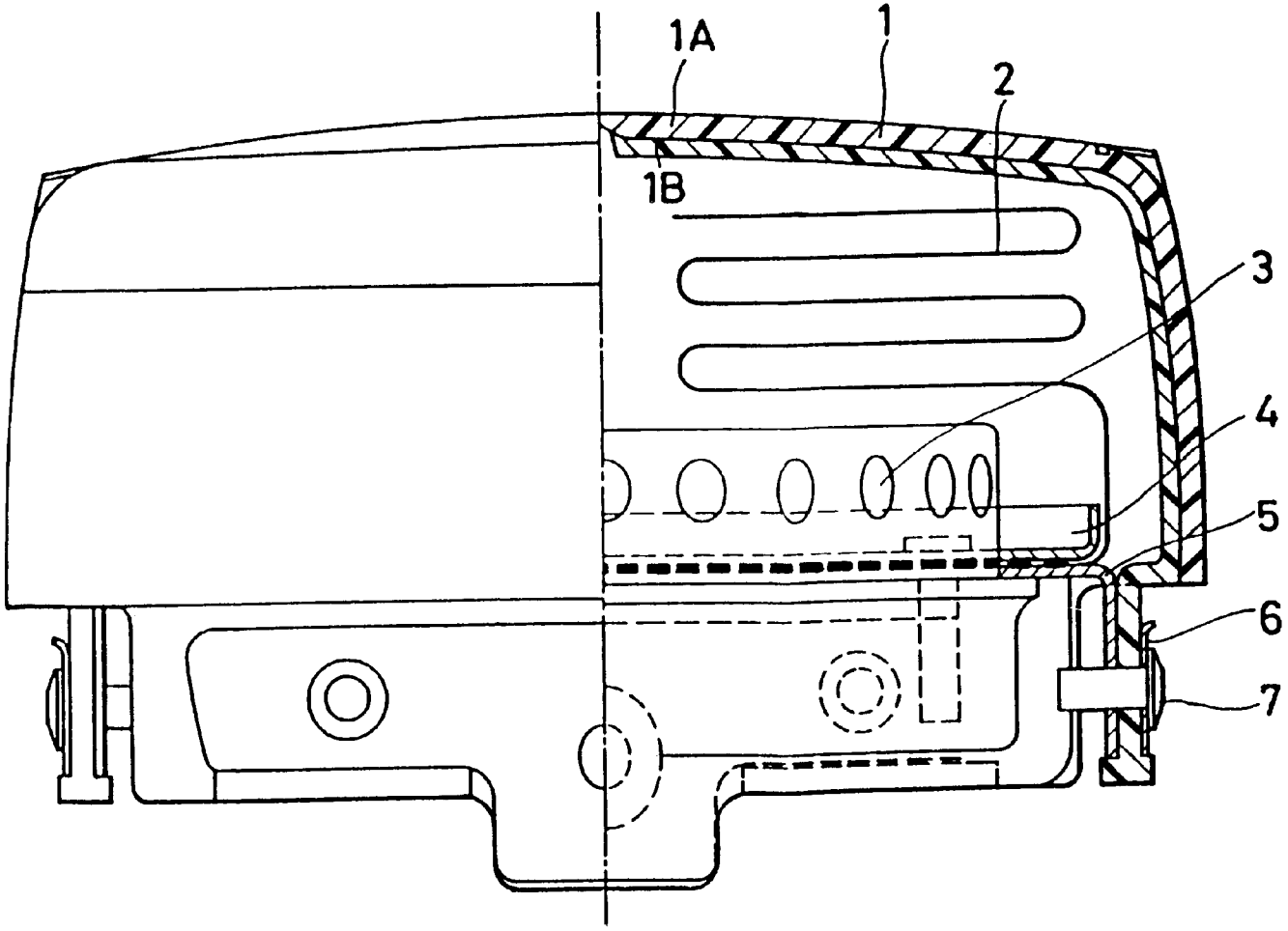
FIG. 1 is a side elevational view of an air bag assembly having a cover embodying the present invention, part of the cover being shown in cross-section.

The air bag assembly shown in the drawing comprises a cover 1, an air bag 2 folded into the housing or compartment formed by the cover 1, an inflator 3, and a retainer ring 4 that clamps an annular band of the air bag material adjacent the bag opening to a retainer base 5. The cover 1 is joined to the base 5 by rivets 6 and a ring or bands 7. An example of an air bag assembly similar to the one shown in the drawings and for which the cover of the present invention is well-suited is described and shown in U.S. patent application Ser. No. 07/335,277 filed Apr. 10, 1989, which is incorporated by reference into the present specification. The present invention is, however, useful in a wide range of designs of air bag assemblies, including those that have covers of various shapes and configurations.

Figure 2:
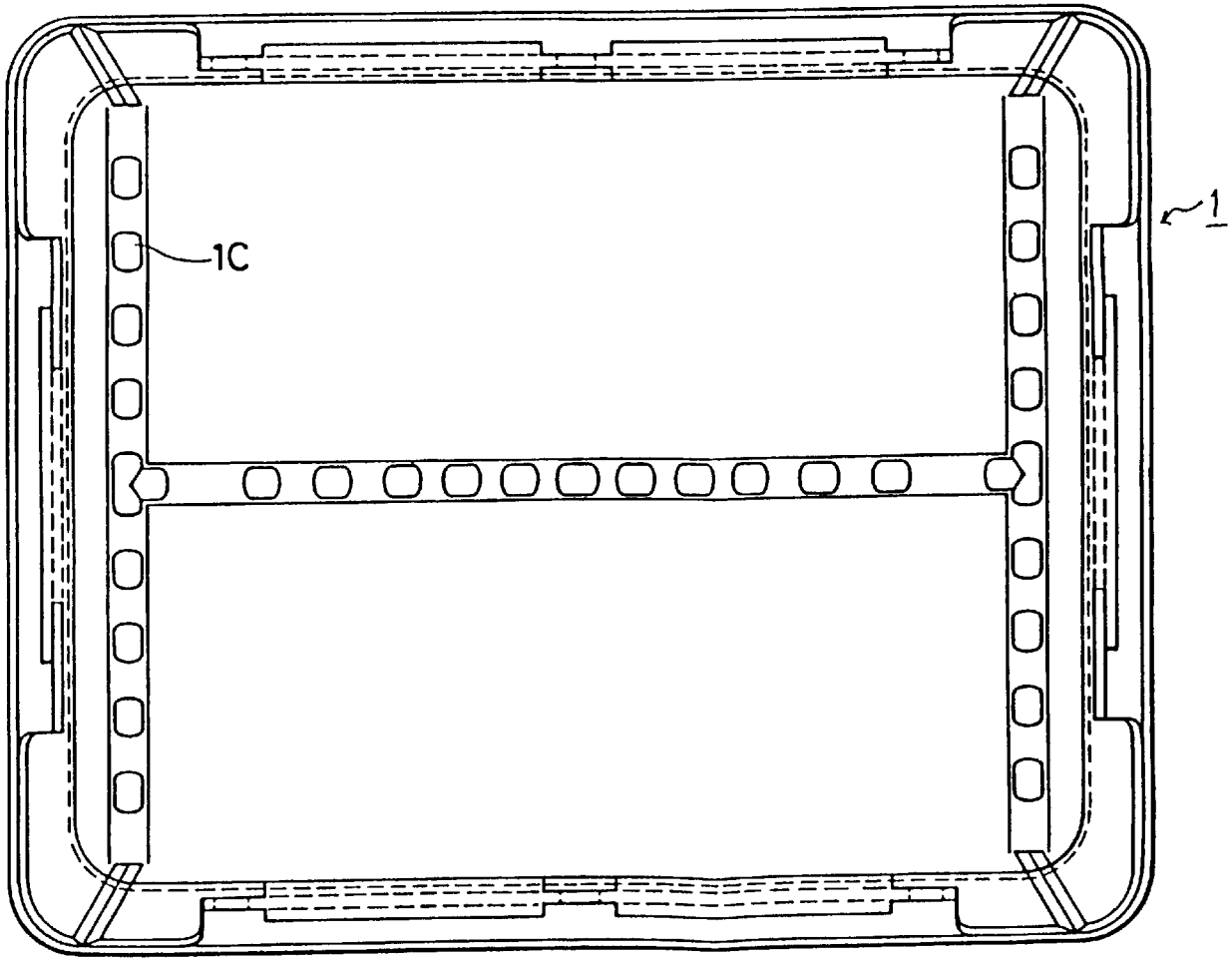
FIG. 2 is a bottom plan view of the cover of FIG. 1.

The cover 1 comprises an external surface layer 1A of a thermoplastic material having a Type A hardness of from about 20 to about 90 as determined by Japanese Industrial Standard K6301-1975 and a core 1B of a thermoplastic material having a modulus of elasticity in flexure of not less than about 1000 $kg/cm^2$ as determined by Japanese Industrial Standard K7203-1982 and a hardness greater than that of the material of the surface layer. The cover 1 has predetermined zones of weakness 1C, such as grooves, slits or both grooves and slits, along which the core easily fractures when the air bag inflates. In the embodiment, the zones of weakness IC consist of bands of reduced thickness (grooves) and spaced-apart perforations extending lengthwise along the center and widthwise along each side of the main wall and grooves along each corner of the core 1B. The perforations do not extend entirely through the surface layer but may extend partway into the inner face. Various configurations of weakened zones can be used in covers embodying the present invention, and the one shown in FIG. 2 is merely exemplary.

Thermoplastic materials suitable for the external surface layer 1A include thermoplastic elastomers based on olefin, styrene, polyester, polyurethane, vinyl chloride or polyamid; polyolefin-based soft materials, such as ethylene-vinyl ester copolymers (EVA), ethylene-α-olefin copolymers (especially those having α-olefins with from 3 to 12 carbon atoms); ethylene-unsaturated carbonic acid and its derivatives and copolymers; and soft polyvinyl chloride. These materials may be used alone or may be blended. Among them olefin-, styrene- and vinyl chloride-based elastomers are desirable from the point of view of imparting a sense of softness to the cover.

The olefin- and styrene-based thermoplastic elastomers are especially preferred because of their ability to retain their softness over a broad range of temperatures. Suitable olefin-based thermoplastic elastomers include olefin-based rubbers, such as EPM ethylene-propylene copolymer), EPDM (ethylene-propylene-diene terpolymer) and ethylene-butene-1 copolymer rubber, polypropylene, polyethylene, polyisobutylene and copolymers of propylene and ethylene. To obtain the desired softness in surface layers that incorporate olefin-based elastomers, it may be necessary to add a hydrocarbon-based rubber softener, such as paraffin-based oil or napthene-based oil.

The styrene-based elastomers that can be used as the base polymer for the surface layer 1A include block copolymers consisting of monovinyl aromatic hydrocarbon polymer blocks and conjugate diene elastomeric polymer blocks and the thermoplastic elastomers based on the hydrogenated derivatives of such block copolymers. These base polymers can be obtained by the conventional method of living polymerization using lithium-based initiators. The styrene-based elastomer may also be the hydrogenated derivatives of a block copolymers consisting of a styrene polymer blocks and butadiene or isoprene polymer blocks—these polymers are excellent in weatherability, thermal aging and softness adjustability.

The above olefin- and styrene-based thermoplastic elstomers may not only be used independently but also may be blended at an appropriate ratio to make the surface layer 1A. More specifically, the material of the surface layer 1A may be a blend of the styrene-based thermoplastic elastomers mentioned above, an olefin- or styrene-based polymer, such as a polyisobutylene, and a hydrocarbon-based rubber softener, as in the case of the above olefin-based elastomers to control the hardness and other qualities of the material.

The content of hydrocarbon-based rubber softener in the surface layer 1A should not exceed 30% by weight. If it exceeds this level, the air bag cover may deteriorate in external appearance (deformation, etc.) after it is left at 110° C. for 500 hours, or it may break in places other than the weakened zones or allow broken pieces to scatter when the air bag inflates. Determining the content of the hydrocarbon-based rubber softener also requires taking into account the hardness (the sense of softness) and the molding/processing properties. When all of these factors are considered, the amount should usually be less than 20% and, preferably, less than 10% by weight. When a rubber softener is included, at least 1% and, preferably, more than 3% should be used.

The surface layer 1A may incorporate inorganic fillers (e.g., calcium carbonate, silica, talc and the like), pigments and stabilizers. Materials with partial bridge structures made by the processes of Japanese published patent application Nos. 26838/1971, 13541/1977, 37953/1977 and 98248/1981 may also be used in the surface layer 1A.

Materials for the surface layer 1A with hardnesses below JIS-A 20 are desirably soft to the touch but are poor in terms of processing moldability and mechanical strength and, therefore, are unsatisfactory. Materials with JIS-A hardnesses greater than 90 present no problems of processing/molding but are undesirably hard. The particular hardness chosen for the surface layer 1A depends to some extent on the thickness of the layer. Generally, it will be preferable to use a material with a hardness in the range of 30 to 70. The best results will most often be obtained when the hardness is in the range of 45 to 65.

The thickness of the surface layer 1A need not be uniform over the entire surface of the cover, but at least about 70%, and preferably more than 80% of the surface area should be not less than 0.5 mm thick. While there is no particular upper limit for the thickness of the layer 1A, it should not exceed 10 mm from the points of view of economy, sense of softness, function of the cover in use and processing/molding efficiency.

Many of the materials suitable for the layer 1A may be foamed up to about three (3) times their solid volume for greater softness and reduced weight.

Materials suitable for the core layer 1B include the following: α-olefin homopolymers; copolymers of ethylene, propylene, etc. (olefin copolymers); polycarbonates; impact resistant polystyrene; AS polymers; and olefin-based rubbers, such as EPM, EPDM and ethylene, butene-1 copolymer rubber. These and other polymers may be used alone or blended to attain the desired properties. As is conventional, the material of the core layer 1B may have incorporated therein various fillers (for example, glass fibers, talc, calcium carbonate, silica, or mica), pigments, stabilizers and the like.

Among the polymeric materials mentioned above, high density polyethylene, polypropylene, propylene-ethylene block and random copolymers, and olefin-based rubbers are particularly desirable; of these polypropylene, propylene-ethylene block copolymers and high density polyethylene are preferred, because they combine well with materials suitable for the external surface layer 1A (e.g., the olefin- and styrene-based elastomers) and have stable properties over a wide range of temperatures.

Good results have been obtained with a blend of a propylene-ethylene block copolymer and an olefin-based rubber (ethylene-propylene rubber). The amount of olefin-based rubber used in the material for the core layer 1B should not, however, exceed 60% by weight. Greater amounts cause problems in molding/processing and in mold maintenance.

If the material of the core layer 1B of the air bag cover has a bending elastic modulus of less than 1000 kg/cm$^2$ or is softer than the material of the surface layer 1A, the cover will not maintain its original shape and can be deformed easily. On the other hand the bending elastic modulus of the core layer material should not exceed 30,000 kg/cm$^2$ in order to provide a sense of softness in the cover as a whole (i.e., enable moderate deformation under contact by the vehicle occupant) and prevent the possibility of breakage in an unintended manner when the air bag inflates at extremely low temperatures. Advantageously, the bending elastic modulus of the core layer material should be in the range of 1,500 kg/cm$^2$ to 11,000 kg/cm$^2$ and, preferably, from 2,000 kg/cm$^2$ to 7,000 kg/cm$^2$. Some materials may have a bending elastic modulus within a desirable range but may still be unsatisfactory due to, for example, large variations in properties with temperature changes or low impact strength.

There is no special limitation on the thickness of the core layer 1B, but it should generally be about 1–3 mm.

As mentioned above, the core portion 1B is provided with zones of weakness which enable the core 1B to break easily when the air bag begins inflating. Those zones may be rows of perforations 1C, notches, or the like. The positions and extents of the weakened zones may vary in air bag covers according to the invention and can be designed taking into account such factors as the shape and strength of the cover.

Covers according to the invention can be manufactured by various conventional molding/processing methods for thermoplastic materials. Insert injection molding is highly suitable. In the insert injection molding method, the core portion is molded in one mold and then placed in another mold in which some space is left for the surface layer. The surface layer is injection-molded in the second mold. Also suitable is the double injection method in which the core portion is molded, the cavity mold is separated from the core portion, a new cavity mold having a space for the surface layer is placed over the core portion without taking the core portion out of the mold, and the surface layer is injection-molded.

The weakened zones of the core portion can be molded into the core portion in the mold or can be separately formed in it after it is molded.

The air bag cover can be coated with decorative colors in order to match the vehicle interior and improve the external appearance of the cover. Coating the surface layer 1A is also desirable from the standpoint of protecting it from damage.

The air bag cover according to the present invention does not cause the vehicle occupant any discomfort when his body contacts it since its relatively hard core portion is covered with the relatively soft surface layer. Because the core portion is hard, however, the cover resists deformation or damage from the usual external forces imposed on it.

When the air bag cover breaks along the weakened zones of the core portion upon inflation of the air bag, the broken pieces of the cover do not separate from the support and scatter around because the core layer is securely adhered to the soft surface layer. Covers according to the present invention do not break in unintended ways (and pieces of the cover do not separate from the support) within a temperature range of −40° C. to 80° C. Even though the cover layer tears along the lines of weakness of the core, it is less frangible than the core layer and less prone to rupture in an unintended manner. Therefore, the cover layer keeps the core layer pieces from being separated from the air bag support.

EXAMPLES AND COMPARATIVE EXAMPLES

The examples of the invention given in Table I are merely illustrative and are not intended to limit the scope of the invention. The comparative examples (Table II) exhibit some of the deficiencies in the characteristics of covers that do not embody the invention.

In examples 1 to 11 and comparative examples 1 to 9, a core portion (1.0–3.0 mm thick) provided with slits (each about 0.7 mm long, 29 slits altogether) was injection-molded with a core material, as described below, using an in-line screw, two-color injection molding machine and a mold-clamping force of 350 tons, and then the surface layer injection-molded in the prescribed thickness over the core portion. Thus the air bag cover 1 shown in FIG. 1 was obtained.

In example 3 and 10, the surface layer was foamed. Foam molding was carried out by blending 5 parts of a $CO_2$-based foaming agent (Master Batch Fine Blow S20N, Mitsubishi Petrochemical Co., Ltd.) for each parts of the surface material.

In examples 4 and 11, the surface layer was coated. After the cover was molded, the surface layer was wiped with isopropyl alcohol, a primer (Sakai Chemical Co., Ltd., MEX5440 and methylethylketone at a 1:1 ratio) was applied to a thickness of 7–10 $\mu$m by spraying and dried for 10 minutes at room temperature, and then a urethane top coat (Sakai Chemical Co., Ltd., MEX6047: hardening agent F-3: thinner 58u=100:10:50) was sprayed to a thickness of 20–25 $\mu$m and dried for 10 minutes at room temperature. The cover was baked at 80° C. for 30–45 minutes.

The materials used in the examples of Table 1 are as follows:

PP-1: Propylene-ethylene block copolymer resin (BC-8, Mitsubishi Petrochemical)
- MFR (230° C., 2.16 kg)=1.8 g/10 min (the melt Flow Rates set forth herein were determined by the procedures of ASTM D 1238)
- Bending elastic modulus=1100 kg/cm$^2$
- JIS-A hardness=100

PP-2: A 60/40 (weight %) blend of propylene-ethylene block copolymer resin (BC-4, Mitsubishi Petrochemical) and ethylene-propylene rubber (EPO7p, Japan Synthetic Rubber)
- BC-4: MFR (230° C., 2.16 kg)=6.5 g/10 min
- Bending elastic modulus=11600 kg/cm$^2$
- EPO7p: ML (100° C.)=70
- Propylene content=27%
- Blend: Bending elastic modulus=4000 kg/cm$^2$
- JIS-A hardness=99

PP-3: A 50/50 blend of propylene block copolymer resin and ethylene-propylene rubber (BC4, Mitsubishi Petrochemical Co., Ltd. and EPO7p, Japan Synthetic Rubber Co., Ltd.)
- BC4: MFR (230° C., 2.16 kg)=6.5 g/10 min
- Bending elastic modulus=11,600 kg/cm$^2$
- EPO7p: ML (100° C.)=70
- Propylene content=27%
- Blended product:
  - bending elastic modulus=2000 kg/cm$^2$
  - JIS-A hardness: 97

PP-4: Polyethylene (MA-4, Mitsubishi Petrochemical)
- MFR=5g/10 min
- Bending elastic modulus=12,000 kg/cm$^2$
- JIS-A hardness=100

PP-5: 30/70 blend of propylene-ethylene block copolymer resin (BC-4, Mitsubishi Petrochemical) and ethylene-propylene rubber (EPO7p, Japan Synthetic Rubber)
- Blend Product:
  - Bending elastic modulus=500 kg/cm$^2$
  - JIS-A hardness=86

EVA: Ethylene-acetic acid vinyl copolymer (V601S, Mitsubish Petrochemical)
- MFR (190° C. 2.16 kg)=15 g/10 min
- Bending elastic modulus=400 kg/cm$^2$
- JIS-A hardness=82

PE-1: Polyethylene resin made by the low pressure method (JX-10, Mitsubishi Petrochemical)
- MFR (190° C., 2.16 kg)=20 g/10 min
- Bending elastic modulus=9000 kg/cm$^2$
- JIS-A hardness=100

PE-2: A 40/60 blend of linear low-density polyethylene resin and ethylene-propylene rubber (UJ280, Mitsubish Petrochemical, and EPO7p, Japan Synthetic Rubber)

UJ280:
MFR (190° C., 2.16 kg)=30 g/10 min
Bending elastic moldulus=2600 kg/cm$^2$
Blended polymer:
bending elastic modulus=4000 kg/cm$^2$
JIS-A hardenss=82

TPO-1: Olefin-based thermoplastic elastomer (Thermolan 3980, Mitsubishi Petrochemical)
JIS-A hardness=93

TPO-2: Olefin-based thermoplastic elastomer (Thermolan 3650, Mitsubishi Petrochemical); 10% by weight rubber softener (pw 380, Idemitsu Kosan)
JIS-A hardness=65

TPS-1: Synthetic-based thermoplastic elastomer (Rubbulon SJ4400, Mitsubishi Petrochemical); 10% pw380
JIS-A hardness=45

TPS-2: Styrene-based thermoplastic elastomer (T-320, Mitsubishi Petrochemical)
JIS-A hardness=15

TPS-3: the material was made by blending 100 parts of the following four ingredients (1) SEBS-1, (2) SPX9400, (3) PIB-1 and (4) OIL at a mixing ratio of 35/15/40/10 (wt %) with 0.2 parts of Irganox 1010 (Ciba Geigy) as a stabilizer and 0.5 parts of carbon black, and mixing them at 200° C. using a double-shaft extruder.
JIS-A hardness=55.
(1) The hydrogenated derivative of styrene-butadiene block copolymer (SEBS-1, Shell Chemical "Kraton"): Brookfield viscosity 20 wt % (toluene solution 2000 cps, 25° C.)
(2) Propylene-ethylene block copolymer resin (SPX9400, Mitsubishi Petrochemical); MFR (230° C., 2.16 kg)=6 g/10 min; bending elastic modulus=4500 kg/cm$^2$
(3) Polyisobutylene (PIB-1) (Tetrax 3T, Japan Petrochemical); viscometric average molecular weight=30000.
(4) Paraffin-based rubber softener (OIL) (pw380, Idemitsu Kosan); 40° C. kinetic viscosity=380 cst.

TPS-4: Prepared by the same method as TPS-3 but with the following composition.
(1) SEBS-1/(2) SPX9400/(3) PIB-1/(4) OIL in the ratio 35/15/30/20 (wt %); JIS-A hardness=45

TPS-5: Prepared by the same method as TPS-3 and at the following composition using the hydrogenated derivative by styrene-butadiene block copolymer.
(1) SEBS-2/(2)SPX 9400/(3) PIB-1 (4) OIL in the ratio 45/15/30/10 (wt %)
JIS-A hardness=68
SEBS-2 (Shell Chemical "Kraton") has a Brookfield viscosity of 20 wt % (toluene solution 1500 cps, 25° C.)

TPS-6: Prepared by the same method as TPS-3.
SEBS-2/SPX 9400/OIL in the ratio 35/5/60 (wt %);
JIS-A hardness=15

TPS-7: Prepared by the same method as TPS-3 with the following composition.
SEBS-1/BC-4/OIL/Calcium carbonate in the ratio 24/9/37/30 (wt %);
JIS-A hardness=55 (For BC-4, see PP-2 above.)

TPO-3: Olefin based thermoplastic elastomer (Thermolan 3600B, Mitsubishi Petrochemical)
JIS-A hardness=70

TPO-4: Olefin based thermoplastic elastomer (Thermolan 3920B, Mitsubishi Petrochemical)
JIS-A hardness=93

In comparative example 10, an air bag cover consisting of a surface layer made of a high-density urethane foam and a core portion made of low-density urethane foam was made and evaluated. The core portion was molded by the RIM method at a low-foaming density and cured and then placed in a mold for forming the surface layer by insert injection molding. Freon gas was used as the foaming agent to foam the surface layer. This method required carrying out the curing process twice, thereby reducing the production rate.

In comparative example 11, an air bag cover provided with a reinforcing net was made and evaluated. A woven net of polyester thread was cut so as to provide gaps corresponding to the zones of weakness of the cover. The net was inserted into a mold and the cover molded by the RIM molding method. Freon gas was used as a foaming agent. The cover was removed from the mold and cured at 100° C. for 30 minutes. It was difficult to form a good skin layer with the net inserted.

The materials of the core layer and surface layer, the JIS-A hardness of the materials and the bending elastic modulus of the core layer material used in the examples and the comparative examples are set forth in Table I and Table II below.

TABLE I (Examples of the Invention)

| | Core Layer | | | Surface Layer | |
|---|---|---|---|---|---|
| Exam. No. | Mat'l | Bend Elas Mod-kg/cm$^2$ | Hardness (JIS-A) | Mat'l | Hardness (JIS-A) |
| 1 | PP-1 | 11000 | 100 | TPS-1 | 45 |
| 2 | PP-2 | 4000 | 99 | TPO-2 | 65 |
| 3 | PP-2 | 4000 | 99 | TPO-2 | 65 |
| 4 | PP-2 | 4000 | 99 | TPO-2 | 65 |
| 5 | PP-3 | 2000 | 97 | TPS-3 | 55 |
| 6 | PP-2 | 4000 | 99 | TPS-3 | 55 |
| 7 | PE-1 | 9000 | 100 | TPS-3 | 55 |
| 8 | PP-2 | 4000 | 99 | TPO-3 | 70 |
| 9 | PP-2 | 4000 | 99 | TPS-4 | 45 |
| 10 | PP-2 | 4000 | 99 | TPS-5 | 68 |
| 11 | PP-2 | 4000 | 99 | TPS-3 | 55 |

TABLE II (Comparative Examples)

| | Core Layer | | | Surface Layer | |
|---|---|---|---|---|---|
| Exam. No. | Mat'l | Bend Elas Mod-kg/cm$^2$ | Hardness (JIS-A) | Mat'l | Hardness (JIS-A) |
| 1 | EVA | 400 | 82 | TPO-2 | 65 |
| 2 | PP-2 | 4000 | 99 | TPS-2 | 15 |
| 3 | PP-2 | 4000 | 99 | TPO-1 | 93 |
| 4 | PE-2 | 400 | 82 | TPS-3 | 55 |
| 5 | PP-2 | 4000 | 99 | TPS-6 | 15 |
| 6 | PP-2 | 4000 | 99 | TPO-3 | 93 |
| 7 | PP-2 | 4000 | 99 | TPS-7 | 55 |
| 8 | PP-4 | 12000 | 100 | TPS-3 | 55 |
| 9 | PP-5 | 500 | 86 | TPS-3 | 55 |
| 10 | Urethane | RIM foamed | — | without net | 10 |
| 11 | Urethane | RIM foamed | — | with net | |

All of the air covers listed in Tables I and II were tested by the following procedures.

(1) Sense of softness

Either an air bag assembly composed of the air bag 2, the cover 1, retainers 4 and 5 and an inflator 3 (see FIG. 1) or a cover 1 alone was left in an environment at a temperature of −20° C. until the sample reached the ambient temperature, and then touched by the hands of 10 persons to evaluate its softness. The softness was rated as satisfactory when all 10 persons felt is as soft, as unsatisfactory when 8 or 9 of the 10 felt it as soft and as poor when less than 8 of the 10 felt it as soft. The same evaluation was made on each cover at a temperature of 80° C.

(2) Shape maintainability

Either an air bag assembly according to FIG. 1 or a cover 1 alone was held at a temperature of 80°–110° C. for many hours (less than 1000 hours) or in 10 heat cycles varying from −40° C. to 100° C. per cycle, and the deformation of the cover during and after the test was observed. The covers with little deformation were evaluated at satisfactory and those with extensive deformation were evaluated as poor.

(3) Low Temperature Operation Test

The air bag assembly was attached to a steering wheel and allowed to attain an ambient temperature (−20° C. in the case of examples 1 to 5 and comparative examples 1 to 3 and −40° C. in the case of the remaining examples and comparative examples). The operation test was made less than one minute later. If the cover broke and scattered, broke in an unintended manner and caused the air bag to tear, or the cover otherwise operated abnormally, it was evaluated as poor. If the cover operated normally, it was evaluated as satisfactory.

(4) Productivity

Twenty covers were continuously manufactured, their external appearance, dimensions and weight were inspected, and the following evaluations assigned: all 20 covers were found acceptable: satisfactory; less than all but more than 90% of them acceptable: unsatisfactory; less than 90% of them acceptable: poor.

(5) Durability Test

Covers according to examples 5 to 11 and comparative examples 4 to 11 were aged by a Geer-type heat aging tester at a temperature of 110° C. for 500 hours. They were then subjected to a low temperature operation test (as in 3 above) at a temperature of −40° C. and were also compared for appearance and shape retention. Only covers that operated normally were considered satisfactory. Any covers that showed deformation, bleeding of softener in the core layer or other physical or appearance changes were judged unsatisfactory.

All air bag covers according to the present invention (Examples 1 to 11) provided very good results in the evaluations of sense of softness, shape maintainability, operation at low temperature, durability and manufacturing productivity.

The comparative examples all exhibited one or more deficiencies, as set forth in Table III immediately below.

TABLE III (Deficiencies of Comparative Examples)

| No. | Deficiency |
|---|---|
| 1 | Poor shape maintainability |
| 2 | Unsatisfactory productivity |
| 3 | Poor sense of softness |
| 4 | Poor shape maintainability |
| 5 | Poor durability and unsatisfactory productivity |

TABLE III-continued (Deficiencies of Comparative Examples)

| No. | Deficiency |
|---|---|
| 6 | Poor sense of softness |
| 7 | Poor durability |
| 8 | Poor operation and durability and unsatisfactory sense of softness |
| 9 | Poor shape maintainability and productivity and unsatisfactory softness |
| 10 | Unsatisfactory sense of softness and poor poor operation at low temperature |
| 11 | Unsatisfactory sense of softness and poor productivity |

There is, therefore, provided by the present invention an air bag cover that has a soft surface layer so that if the vehicle occupant contacts it, it does not feel uncomfortable. Furthermore, since the core portion is relatively hard, the cover maintains its shape very well and is highly durable. When the air bag inflates and breaks the cover along the weakened zones, the soft surface layer can reliably prevent the scattering of the broken core pieces. The cover can be manufactured efficiently by conventional molding methods, such as two-color injection molding, simply and with accuracy at a high yield rate with few rejects, thus enabling the production cost to be greatly reduced.

We claim:

1. A *unitary* cover for housing a folded vehicle air bag, the cover being made solely of polymeric materials, being adapted to be fastened to a retainer base in a position generally between the air bag and the vehicle component and having weakened zones that enable it to break easily when the air bag inflates, characterized in that it has an external surface layer *and a core layer integrally molded together, said surface layer* formed of a thermoplastic polymeric material having a Type A hardness of from about 20 to about 90 as determined by Japanese Industrial Standard K6301-1975 and [a] *said* core layer formed of a thermoplastic polymeric material having a modulus in elasticity in flexure of not less than about 1000 kg/cm$^2$ as determined in accordance with Japanese Industrial Standard K7203-1982 and a hardness greater than that of the surface layer, and in that the weakened zones are formed in the core layer.

2. An air bag cover according to claim 1 and further characterized in that the thermoplastic polymeric material of the external surface layer contains a predominant amount of a member of the group consisting of olefin-based elastomers, styrene-based elastomers, vinyl-chloride elastomers, soft polyvinyl chloride, and combinations thereof.

3. An air bag cover according to claim 2 and further characterized in that the olefin-based elastomer is selected from the group consisting of ethylene-propylene copolymer synthetic rubber, ethylene-propylene-diene terpolymer synthetic rubber, ethylene-butene-1 copolymer synthetic rubber, polypropylene, polyethylene, polyisobutylene, and combinations thereof.

4. An air bag cover according to claim 2 and further characterized in that the styrene-based elastomer is selected from the group consisting of block copolymers of monovinyl aromatic hydrocarbon polymer blocks and conjugate diene polymer blocks, hydrogenated derivatives of block copolymers of monovinyl aromatic hydrocarbon polymer blocks and conjugate diene polymer blocks, hydrogenated derivatives of block copolymers of styrene polymeric blocks and butadiene polymer blocks, and hydrogenated derivatives of block copolymers of styrene polymer blocks and isoprene polymer blocks.

5. An air bag cover according to claim 3 or claim 4 and further characterized in that the material of the external layer contains a hydrocarbon-based rubber softener in an amount of up to 30% by weight.

6. An air bag cover according to claim 1 and further characterized in that thermoplastic polymeric material of the core layer contains a predominant amount of a member of the group consisting of high-density polyethylene, polypropylene, block copolymers of propylene and ethylene, random copolymers of propylene and ethylene, olefin-based synthetic rubbers, and combinations thereof.

7. An air bag cover according to claim 6 and further characterized in that the material of the core layer contains an olefin-based synthetic rubber in an amount not exceeding 60% by weight.

8. An air bag cover according to claim 6 and further characterized in that the material of the core layer is a blend of a block copolymer of propylene and ethylene and an olefin-based synthetic rubber and in that the amount of the olefin-based synthetic rubber in the blend does not exceed 60% by weight.

*9. A cover for housing a folded vehicle air bag, the cover being made solely of polymeric materials, being adapted to be fastened to a retainer base in a position generally between the airbag and the vehicle component and having weakened zones that enable it to break easily when the airbag inflates, characterized in that it has an external surface layer formed of a thermoplastic polymeric material having a Type A hardness of from about 20 to about 90 as determined by Japanese Industrial Standard K6301-1975 and a core layer formed of a thermoplastic polymeric material having a modulus in elasticity in flexure of not less than about 1000 kg/cm$^2$ as determined in accordance with Japanese Industrial Standard K7203-1982 and a hardness greater than that of the surface layer, and in that the weakened zones are formed in the core layer.*

*10. An airbag cover according to claim 9 and further characterized in that the thermoplastic polymeric material of the external surface layer contains a predominant amount of a member of the group consisting of olefin-based elastomers, styrene-based elastomers, vinyl-chloride elastomers, soft polyvinyl chloride, and combinations thereof.*

*11. An airbag cover according to claim 10 and further characterized in that the olefin-based elastomer is selected from the group consisting of ethylene-propylene copolymer synthetic rubber, ethylene-propylene-diene terpolymer synthetic rubber, ethylene-butene-1 copolymer synthetic rubber, polypropylene, polyethylene, polyisobutylene, and combinations thereof.*

*12. An air bag cover according to claim 10 and further characterized in that the styrene-based elastomer is selected from the group consisting of block copolymers of monovinyl aromatic hydrocarbon polymer blocks and conjugate diene polymer blocks, hydrogenated derivatives of block copolymers of monovinyl aromatic hydrocarbon polymer blocks and conjugate diene polymer blocks, hydrogenated derivatives of block copolymers of styrene polymeric blocks and butadiene polymer blocks, and hydrogenated derivatives of block copolymers of styrene polymer blocks and isoprene polymer blocks.*

*13. An air bag cover according to claim 11 or claim 12 and further characterized in that the material of the external layer contains a hydrocarbon-based rubber softener in an amount of up to 30% by weight.*

*14. An air bag cover according to claim 9 and further characterized in that thermoplastic polymeric material of the core layer contains a predominant amount of a member of the group consisting of high-density polyethylene, polypropylene, block copolymers of propylene and ethylene, random copolymers of propylene and ethylene, olefin-based synthetic rubbers, and combinations thereof.*

*15. An air bag cover according to claim 14 and further characterized in that material of the core layer contains an olefin-based synthetic rubber in an amount not exceeding 60% by weight.*

*16. An air bag cover according to claim 14 and further characterized in that the material of the core layer is a blend of a block copolymer of propylene and ethylene and a olefin-based synthetic rubber and in that the amount of the olefin-based synthetic rubber in the blend does not exceed 60% by weight.*

* * * * *

UNITED STATES PATENT AND TRADEMARK OFFICE

CERTIFICATE OF CORRECTION

PATENT NO. : Re. 36,898
DATED : October 3, 2000
INVENTOR(S) : Sawada et al.

It is certified that error appears in the above-identified patent and that said Letters Patent is hereby corrected as shown below:

Claim 1,
Line 4, "component" should be --occupant--.

Claim 9,
Line 4, "component" should be --occupant--.

Signed and Sealed this

Third Day of July, 2001

*Attest:*

Nicholas P. Godici

*Attesting Officer*

NICHOLAS P. GODICI
*Acting Director of the United States Patent and Trademark Office*